Oct. 22, 1940.  L. Z. LA FOREST  2,218,542
PHONOGRAPH
Filed Nov. 27, 1937  6 Sheets-Sheet 4
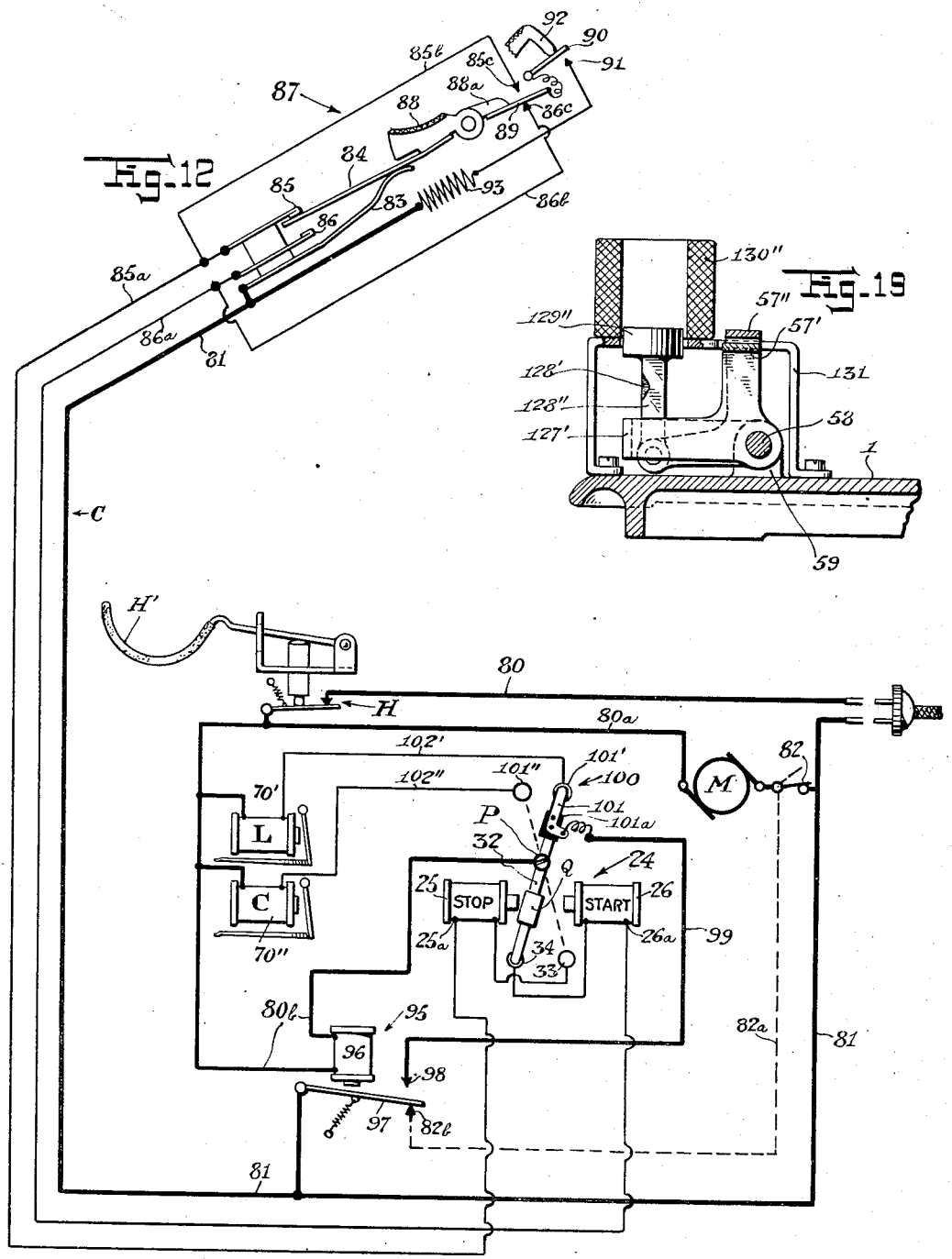
INVENTOR
Louis Z. LaForest
BY
Henry Canahan
ATTORNEY

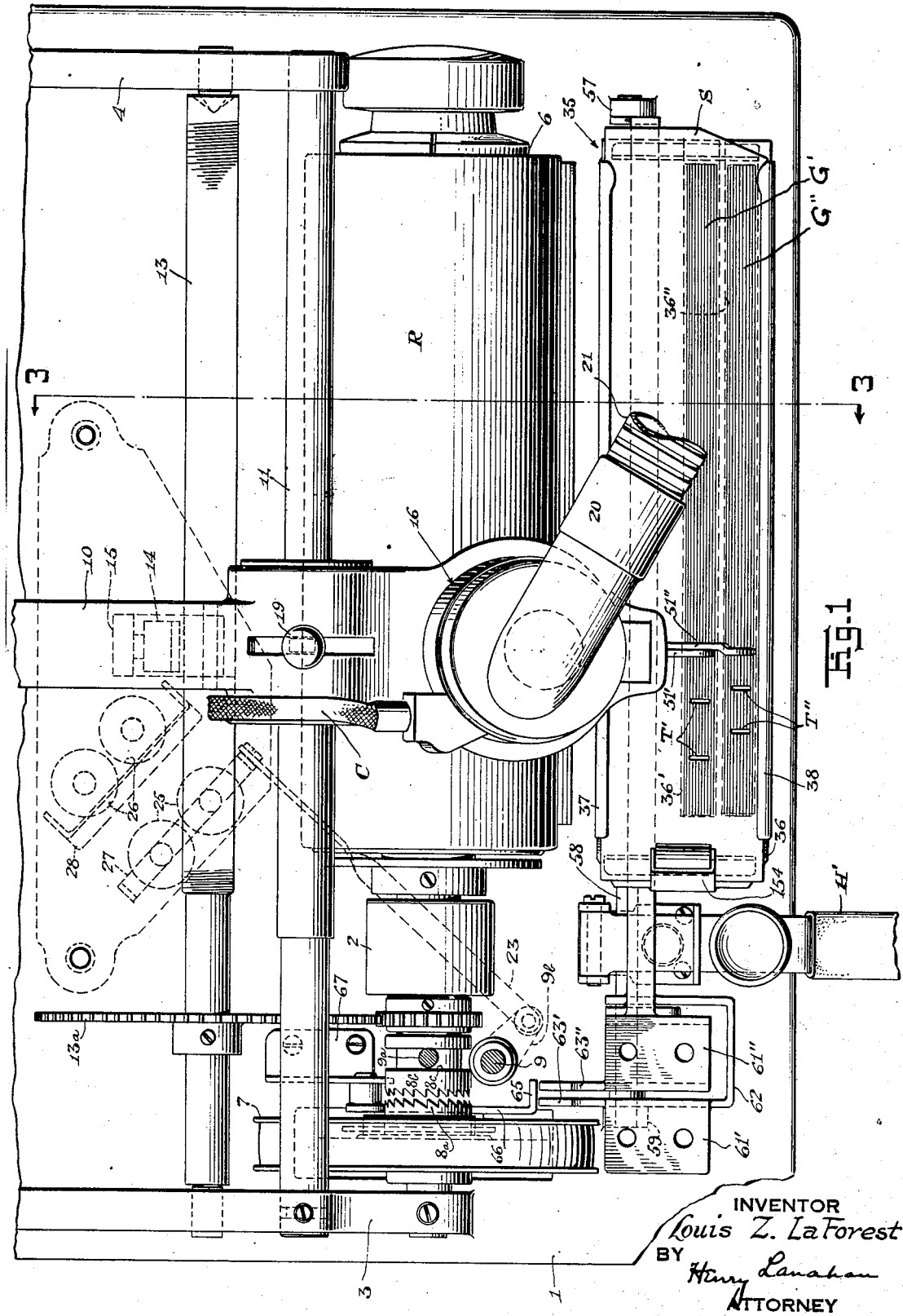

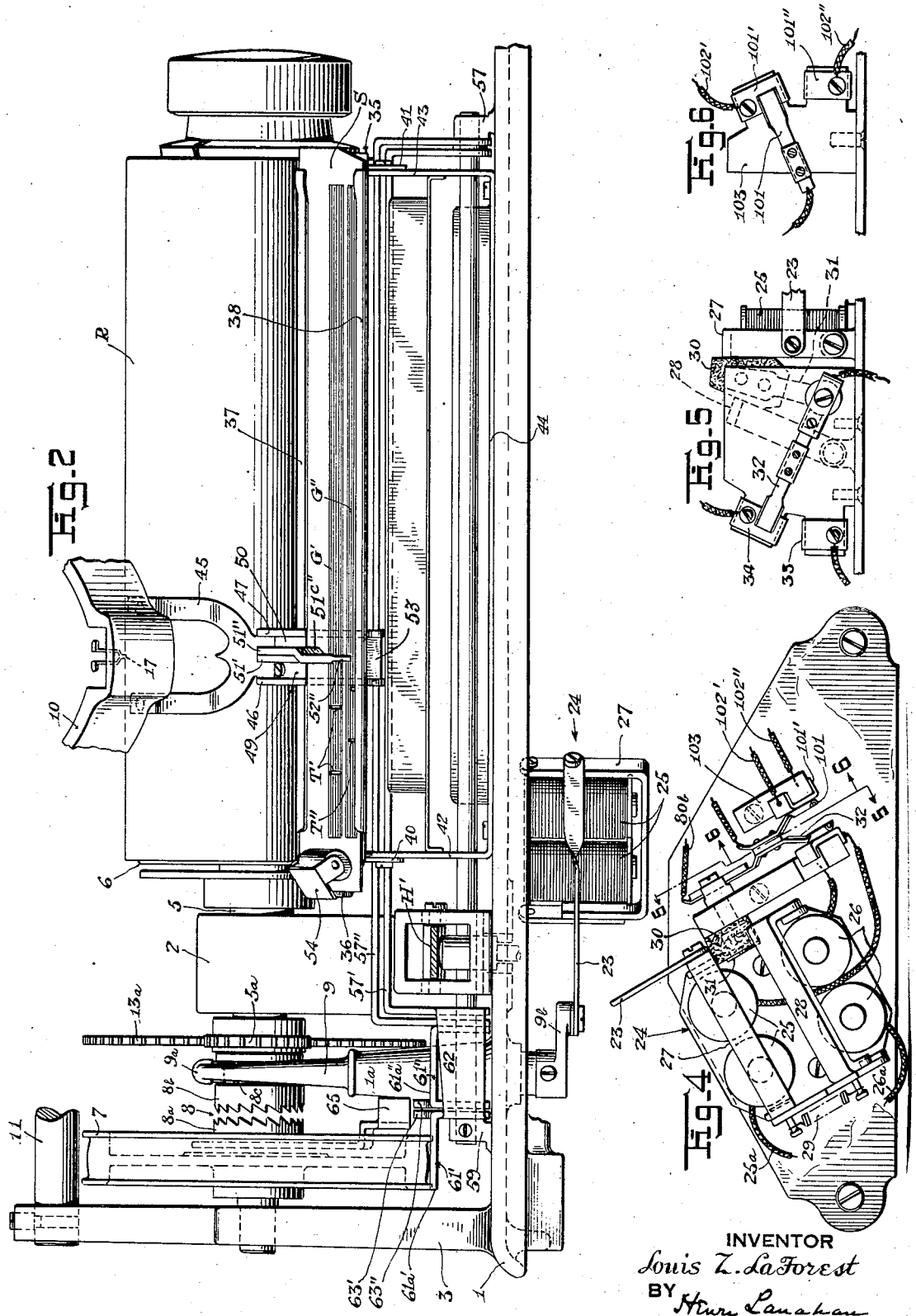

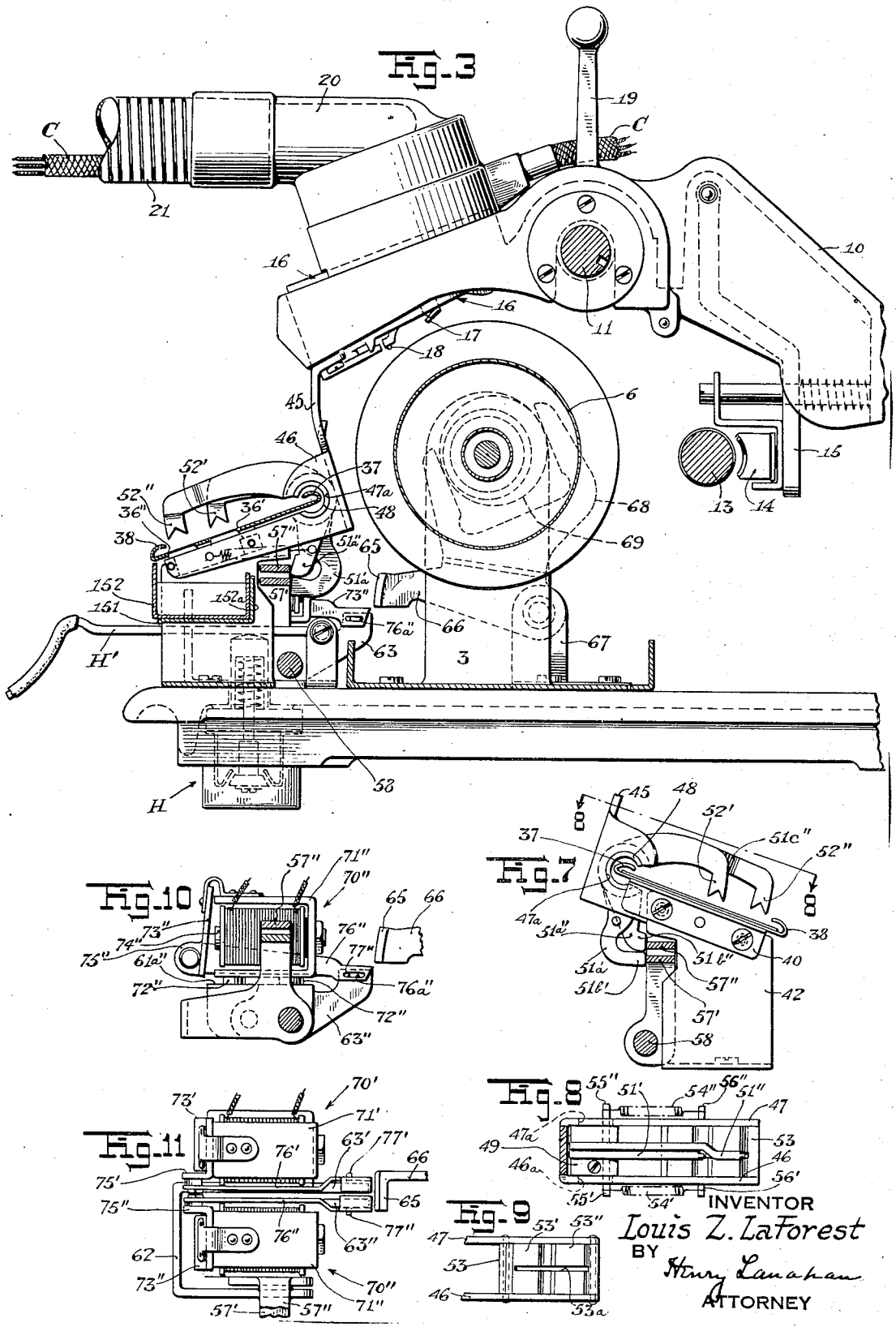

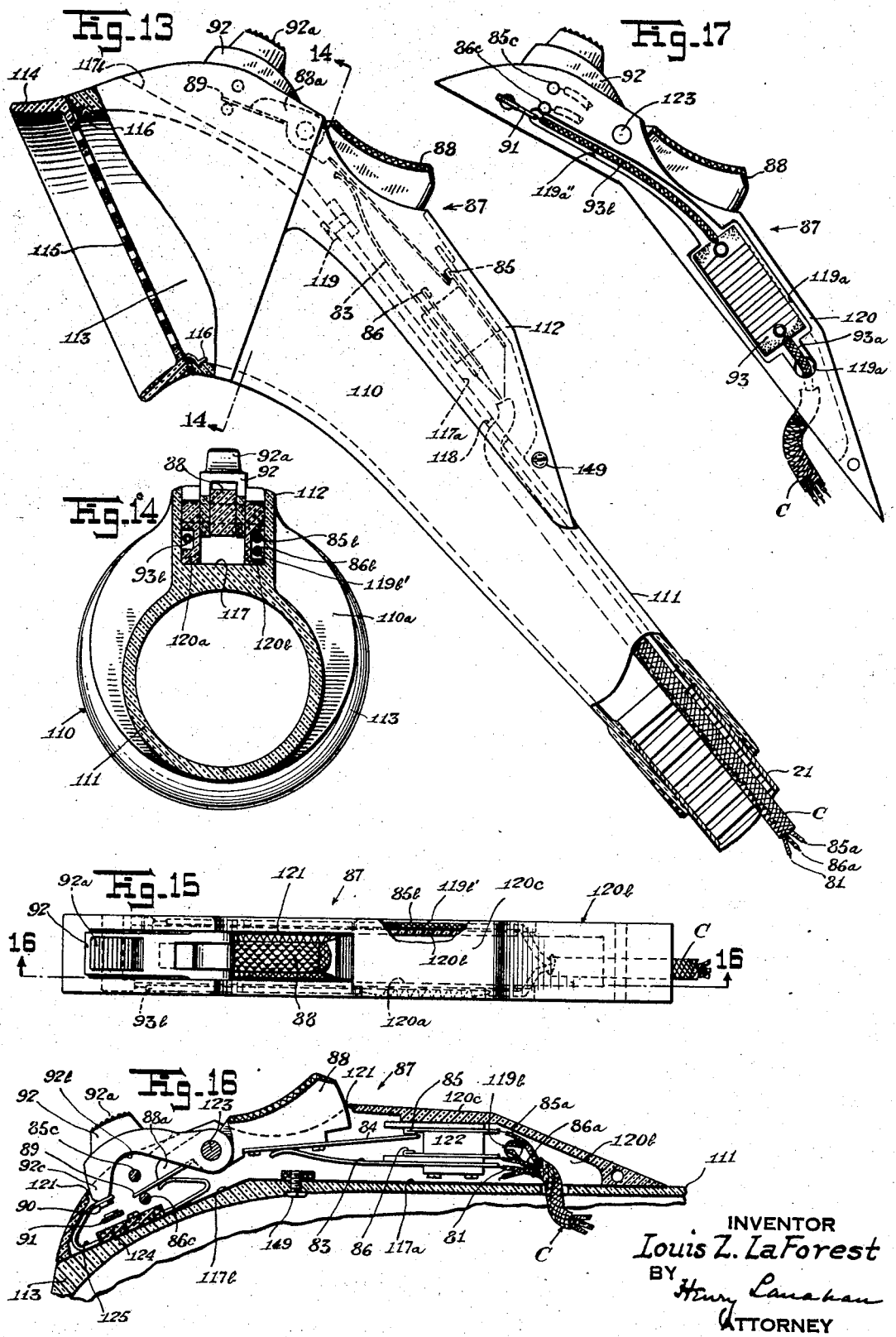

Oct. 22, 1940.  L. Z. LA FOREST  2,218,542
PHONOGRAPH
Filed Nov. 27, 1937  6 Sheets-Sheet 6
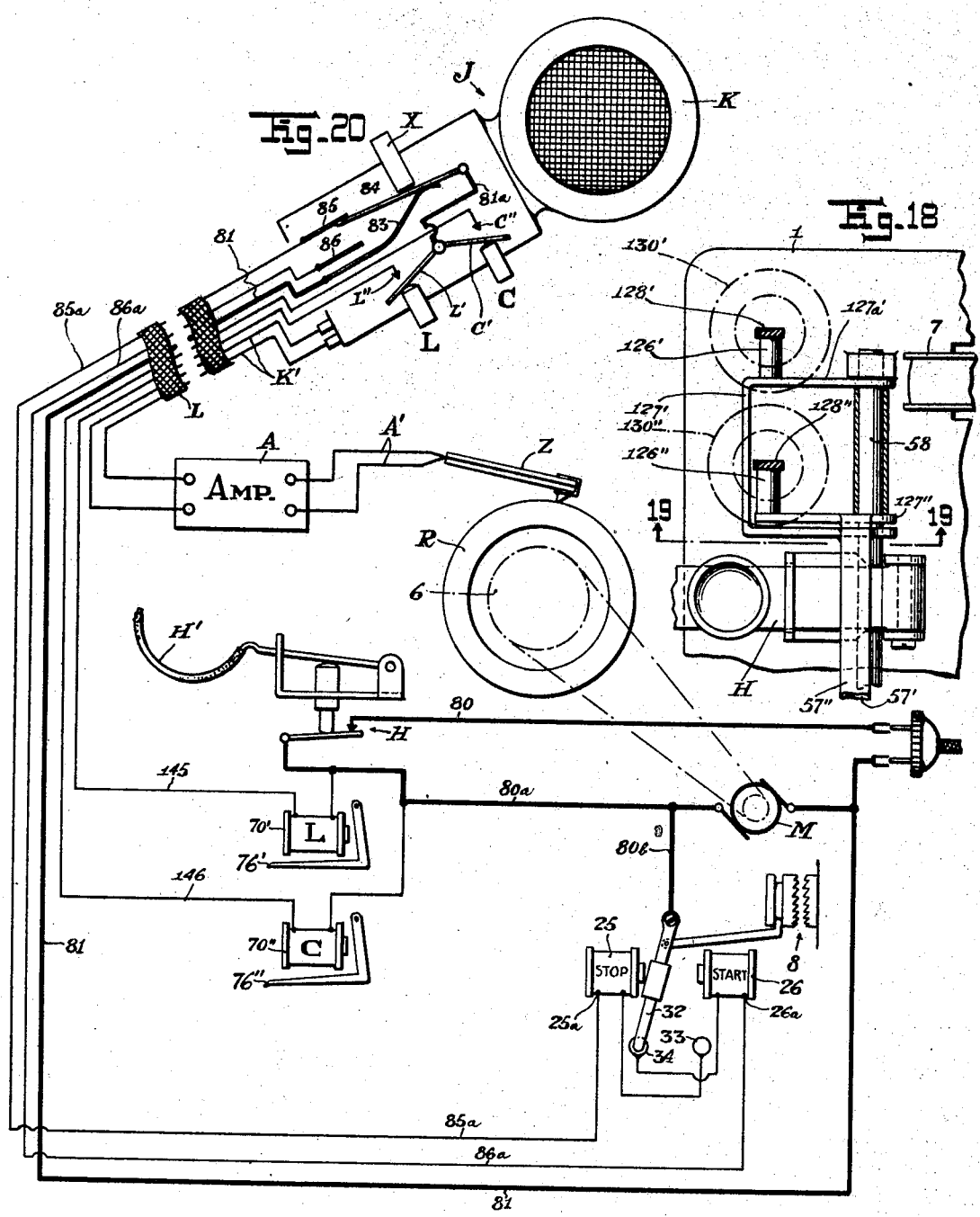
INVENTOR
Louis Z. La Forest
BY
Henry Lanahan
ATTORNEY Patented Oct. 22, 1940

2,218,542

UNITED STATES PATENT OFFICE 2,218,542

PHONOGRAPH

Louis Z. La Forest, Orange, N. J., assignor to Thomas A. Edison, Incorporated, West Orange, N. J., a corporation of New Jersey Application November 27, 1937, Serial No. 176,799

11 Claims. (Cl. 274—17)

This invention relates to phonographs, and especially to phonographs of the type adapted for the recordation and/or reproduction of dictation and the like.

It is well known that in the use of such phonographs there is frequent necessity for the effective annotation of the record—i. e., the identification or indication of points whereas individual sequences of dictation (letters or the like) begin and end, points whereat errors in the recorded matter have been made and/or whereat those errors have been corrected, etc. My invention has for one of its objects the provision of improved and especially convenient means for annotating the record.

Record annotation is very frequently practised by providing, for use with each record, an individual index slip—i. e., a piece of paper or other suitable material—which may be held in some predetermined relationship to the record during recordation on the latter and on which the annotations for that record may be made; this slip may be suitably employed and referred to in later transcription from the record. An object of my invention is the provision of improved and especially convenient means for making annotations upon such an index slip.

It is an object to provide the improved annotating means in form suitable for manipulation or control remotely from the phonograph.

It is an object to provide improved arrangements for obtaining the power for the immediate actuation of the annotating means.

It is an object to provide annotating means which may on occasion be satisfactorily operated without interruption of the operation of the phonograph.

It is an object to automatically control the operation of the phonograph on occasions when the failure aptly to control that operation might deleteriously affect the annotation.

It is an object to provide a plurality of annotating means selectively operable by control remotely from the phonograph.

It is an object to provide especially simple means for the selective remote control of such a plurality of annotating means.

It is an object to provide broadly, in a phonograph having main and auxiliary functions, simplified means for selectively controlling those respective functions.

It is an object to provide, in a phonograph having a main and a plurality of auxiliary functions, simplified means for selectively controlling all those respective functions.

It is an object to utilize the start-and-stop control of the phonograph in a novel and useful additional manner.

It is an object to associate, with an electrically operated start-and-stop control, additional apparatus enabling it to perform additional useful functions.

It is an object to provide, in the mouthpiece of the phonograph, an improved and simplified controlling switch assembly.

It is an object to provide a generally improved mouthpiece construction.

Other and allied objects will more fully appear from the following description and the appended claims.

In the detailed description of my invention, hereinafter set forth, reference is had to the accompanying drawings, of which Figure 1 is a plan view of the principal portions of a phonograph in which my invention has been embodied;

Figure 2 is a partial elevational view of the phonograph illustrated in Figure 1;

Figure 3 is a vertical cross-sectional view of the same phonograph, taken principally along the line 3—3 of Figure 1;

Figure 4 is a bottom plan view of the electromagnet assembly which I have illustrated as a control means for the main operation of the phonograph;

Figure 5 is a vertical cross-sectional view taken along the line 5—5 of Figure 4;

Figure 6 is a similar view taken along the line 6—6 of Figure 4;

Figure 7 is a view, principally in side elevation, of the annotating means with which I have illustrated my invention;

Figure 8 is a substantially horizontal cross-sectional view taken along the line 8—8 of Figure 7;

Figure 9 is a plan view of the die portion of the annotating means, as seen looking downwardly from the index slip holder 35;

Figure 10 is a view, principally in side elevation, of one of the actuating electromagnets in position upon its respective one of the tables 61a' and 61a'' of earlier figures;

Figure 11 is a plan view of both of the actuating electromagnets in position upon their respective tables;

Figure 12 is a schematic diagram showing the electrical inter-connection of the various portions of the phonograph according to the preferred embodiment of my invention;

Figure 13 is an elevational view of the mouthpiece of the phonograph according to my invention;

Figure 14 is a cross-sectional view taken along the line 14—14 of Figure 13;

Figure 15 is a top view of the insert or switch portion of the mouthpiece of Figure 13;

Figure 16 is a cross-sectional view taken along the line 16—16 of Figure 15;

Figure 17 is a side elevational view of the insert or switch portion of the mouthpiece;

Figure 18 is a fractional plan view of a corner of the phonograph, illustrating a modification of my invention in respect of the actuating means for the annotating devices;

Figure 19 is a vertical cross-sectional view taken principally along the line 19—19 of Figure 18; and Figure 20 is a schematic diagram showing an alternative electrical inter-connection of various phonograph portions, and certain modifications in respect of those portions, according to my invention.

In Figures 1, 2 and 3 appear the principal portions of a phonograph with which I have incorporated my invention. These may include a base plate 1 having central standard 2 and lefthand and righthand end standards 3 and 4, respectively. Rotatably journalled in the central standard 2 is a mandrel shaft 5 carrying the cylindrical mandrel 6 to the right of the standard 2, onto which mandrel may be removably mounted a cylindrical record R (the term "record" being used in a broad sense to include a blank before the recordation of matter thereon). The mandrel is adapted to be rotated (for example in a clockwise direction as shown in Figure 3) by a pulley 7 in axial alignment therewith, which pulley in turn is driven by a suitable motor (not shown). The mandrel rotation is controlled by the engagement and disengagement of a clutch 8 interposed between it and the pulley 7; this clutch may comprise the coacting members 8a and 8b, the former being secured to pulley 7 and the latter being splined to the mandrel shaft 5 and moved therealong into and out of engagement with the former by a clutch-control arm 9. This arm may be rockably mounted in a boss 1a upstanding from the base 1, and may have the reversely-curved extremity 9a engaging a groove 8c in the clutch member 8b; it extends downwardly through the base 1 to have secured to its lower extremity a crank 9b rocked by mechanism hereinafter mentioned.

A carriage 10, slidably supported on guide rods one of which appears as 11, which in turn may be supported parallel with the mandrel shaft 5 by the end standards 3 and 4, is caused to move transversely of the direction of the mandrel rotation during that rotation; such carriage movement is effected by a feeding mechanism comprising a feed-screw 13 journalled between the end standards, and a feed-nut 14 carried by an arm 15 downhanging from the carriage 10—the feed-screw being rotarily driven by the mandrel rotation through a gear train comprising gear 13a secured on the feed-screw and gear 5a secured on the mandrel shaft.

In the forward portion of the carriage is carried a translating device in the form of a sound box 16, provided for example with the recording stylus 17 and the reproducing stylus 18. A control lever 19 may be provided at the top of the carriage, rockable forwardly and backwardly from a central or "neutral" position to selectively engage either the recording stylus 17 or the reproducing stylus 18 with the record; when in "neutral" position it may maintain both styli out of engagement with the record, and may also then disengage the feed-nut 14 from the feed-screw 13, to then stop the carriage movement. A neck 20 may extend away from the top of the sound box 16, and to this neck may be connected a speaking tube 21; at the outer extremity of this tube may be secured a mouthpiece, as illustrated in later figures. It will be understood that the function of the neck 20, speaking tube 21 and the mouthpiece is the conveyance of sound to the sound box 16 when that is adjusted by the lever 19 for recordation, and the conveyance of sound from the sound box when that is adjusted for reproduction.

The clutch 8 is conveniently controlled by an electromagnet assembly 24 of the type illustrated and described in U. S. Patent No. 1,380,486 to Langley; this appears dottedly in Figure 1, and has been illustrated more in detail in Figures 4 and 5. Briefly it may consist of a pair of serially connected "stop" electromagnets 25 and a pair of serially connected "start" electromagnets 26, these pairs having first terminals 25a and 26a respectively; two respective pivoted yoke armatures 27 and 28, biased toward each other by a spring 29 and jointly occupying a position according to which had been last attracted by its respective pair of electromagnets; a pad 30 carried by a pivoted arm 31 and interposed between the armatures and moved thereby between two positions; a switch pole 32 moved between two positions by the pad movement; and switch contacts 33 and 34, respectively in series with the second terminals of the "stop" and "start" electromagnets, the pole 32 completing the actuating circuit through one or the other of the switch contacts for one or the other pair of electromagnets. As will appear from reference to the mentioned patent, the arrangement is such that upon actuation of the pair of electromagnets whose circuit is completed through pole 32, the armatures and pad and switch pole will be moved from their one position to their other position, thereby breaking the circuit of the electromagnets which were actuated and preparing the circuit of the other electromagnets for actuation. The movement of one of the armatures is employed to engage or disengage the clutch, according to which pair of electromagnets were actuated, by connection of that armature through a rod 23 to the clutch crank 9b above mentioned.

Parallel with the path of the carriage 5, and preferably in front of and below that path, is mounted a holder 35 for an index slip S; this holder may comprise a base 36 having upwardly folded-over flanges 38 and 37 respectively along its front and back edges. A slip S is inserted in the holder by longitudinally sliding it therein, from the righthand end, under the flanges 37 and 38; a clip device 154 (such for example as that shown and described as 54 in the copending application of Heinrich F. Max Gramann, Serial No. 171,653, filed October 29, 1937) may be provided at the lefthand end of the holder for positively retaining the slip in its inserted position. The holder may be inclinedly disposed so that the top surface of a slip S held therein will face somewhat forwardly as well as upwardly; it may be mounted at or near its extremities only as by flanges 40 and 41 downhanging therefrom, these being screwed respectively to the upright ends 42 and 43 of a wide U-shaped member 44 secured in longitudinally extending arrangement on the top of the base 1.

The base 36 of the holder may be provided with two longitudinal apertures 36' and 36", parallel with each other and preferably near the front of the holder; these apertures are provided to permit the operation of the slip-annotating means in the form of punch means. Such annotating means, which I prefer, may broadly be of the punch-and-die type disclosed in the above copending application of H. F. M. Gramann, modified for example to the structure hereinafter specifically described; it is to be understood, however, that I intend no unnecessary limitations of the broader aspects of my invention to this specific structure, to this particular type of punch means, or even to a punch form of the annotating means.

The punch means which I have particularly shown herein may be described as follows: Downhanging from the front of the carriage 8 and passing behind the holder 35 is a bracket 45; extending forwardly from the lower portion of this bracket (as by virtue of forward folding of the bracket material) are the mutually spaced punch-frame members 46 and 47. Underneath and in slight spaced relationship to the holder 35 these frame members may extend substantially to the front of the holder; about the rear holder flange 37 the frame members may be provided with circular apertures 46a and 47a, respectively; and above the holder 35 the frame members may extend around and slightly forward of these apertures, terminating with a spacing above the top of the holder 45. Terminally fitting within the two apertures 46a and 47a is a tube 48, longitudinally slotted to have a C-shaped cross-section so that it may encircle the rear holder flange 38. Between the frame members 46 and 47 and next to the lefthand such member 46 a C-shaped collar 49 is secured about the tube 48, and to the inner surface of that collar is secured the central portion of a punch arm 51'—this portion being formed with a C-shaped opening fitting about the tube 48. Next to the punch arm 51' is placed a punch arm 51", having a central portion likewise formed to fit about the tube 48. Between the righthand punch-frame member 47 and the punch arm 51", and secured to that arm, a C-shaped collar 50 may be placed about the tube 48, serving to space the pair of arms 51' and 51" centrally between the punch-frame members 46 and 47. The punch arms may extend forwardly above the holder 35, to terminate in the respective downwardly directed extremities 52' and 52" respectively above the holder-base apertures 36' and 36", the longer arm 51" being provided with an offset 51c" to bring its extremity 52" into front-and-back alignment with the other arm extremity 52'.

The punch means and immediately associated parts, while appearing in considerable detail in Figure 3, are further illustrated in detail in Figures 7, 8 and 9.

The punch arm extremities 52' and 52" are shaped to act as punches. For this purpose they may desirably be of inverted V-shape (as viewed from the side) characterized by two points, these points may be of slightly different length, and the width of the arms (or front-and-back dimension) may progressively reduce in slight degree in direction away from the points; the thickness of side-to-side punch dimension may if desired be maintained constant. It will be understood that when either punch arm is depressed to force its extremity against and through a slip S retained in the holder 35, that slip will be perforated with a narrow front-and-back slit; such slits formed by the rear punch 52' (indicating for example length of dictation sequences) have been designated as T', while such slits formed by the forward punch 52" (indicating for example points of error and/or correction) have been designated as T". The paths on a slip S over which the respective punches are moved by the travel of the carriage 8, and at any point along which the punch may be operated to make an annotation or slit, have been designated as G' and G", respectively; and it will be understood that the shading of these paths in the figures may designate the optional reduction of the thickness of the slip in these paths, for the facilitation of the punching operation.

The paths G' and G" of course lie over the longitudinal holder-base apertures 36' and 36", respectively; and to minimize tendencies of the slip to be pushed downwardly by the punches into those apertures, and otherwise to insure the formation of clean and sharp slits T' and T", there is desirable the use of die means beneath the slip S. Such means I have illustrated as the die-block 53 secured between the punch-frame members 46 and 47 beneath the holder 35, provided with the ridges 53' and 53" extending upwardly into the apertures 36' and 36" into at least substantial contact with the bottom of a slip S held in the holder, and further provided with the central narrow slot 53a in alignment with and just wide enough to admit either punch when it is depressed through the slip S. The slot 53a may extend downwardly completely through the die-block 53 for the disposal of the small pieces or punchings punched out of the slips S.

The punch arms 51' and 51" are extended downwardly from their central portions by the respective lower arm portions 51a' and 51a", which are slightly curved forwardly to terminate in the respective vertical lower extremities or "heels" 51b' and 51b" (the former of which may be at a slightly lower elevation than the latter); it will accordingly be understood that the respective punches may be actuated by rearward pressure upon and movement of the respective heels 51b' and 51b". For providing such pressure and movement when desired I have shown two bails 57' and 57", pivoted to and disposed above a rod 58 secured in small standards 59 near the two ends of base 1, and extending, for somewhat further than the path of carriage travel, in elevational alignment respectively with the two heels 51b' and 51b". Forward movement of the bails may be limited, and a normal position therefor established, by their impingement against the upright ends of the member 44 (i. e., 42 and 43). The heels 51b' and 51b" may be biased against the bails, and the bails thereby into their normal positions just mentioned, by tension springs 54' and 54", respectively disposed between pins 55' and 55" respectively secured in the lower arm portions 51a' and 51a" and pins 56' and 56" respectively secured in the punch-frame members 46 and 47. It will be understood that this biasing and limiting system also establishes the normal positions of the punches 52' and 52"—slightly spaced above a slip S held in the holder 35—which will be uniform for all positions of the carriage within its travel path, in view of the parallelism of the bails to that path.

A preferred manner of actuating the bails (and thus the annotating means) according to my invention is illustrated, partially in Figures 1 and 2 and more completely in Figures 10 and 11. Thus at the lefthand end of the top bail 57" I pivot to the rod 58 a small bail-like or inverted U-shaped member 61"; this I secure to the bail 57" so that rocking of the member 61" will cause rocking of that bail. Between the member 61" and the lefthand small standard 59 I pivot to the rod 58 another small member 61' which need merely be of inverted L-shape; this I secure to the bail 57' (as by the horizontal U-shaped strap 62 jumping around the member 61", forwardly thereof and with a spacing therefrom) so that rocking of the member 61' will cause rocking of that bail 57'. The horizontal top portions of the members 61' and 62" have been designated for convenience as the "tables" 61a' and 61a", respectively. Extending rearwardly and somewhat upwardly from the vertical portion of the member 61' and from the adjacent lefthand vertical portion of the member 61" are the respective bail-cranks 63' and 63"; it will be understood that upon downward pressure on and movement of either of these bail-cranks, its associated member 61' or 61" and its associated bail 57' or 57" will be rocked clockwise (as shown in Figure 3 or 10) to actuate the respective punch 52' or 52".

The preferred manner of actuation is by the power of the machine—e. g., by the rotation of the pulley 7; the preferred control of the actuation is electromagnetic. Accordingly I have illustrated a member recurrently driven downwardly by the rotation of the pulley, and electromagnetic means for rendering either bail-crank (and hence either punch) responsive to that member, so that it is operated by the power of the machine.

The recurrently driven member may be a lug 65 folded rightwardly from the forward extremity of an arm 66 whose rear extremity is pivoted to a small standard 67 just to the right of, and a little behind a vertical plane passing through the axis of, the pulley 7. The arm and lug are oscillatorily moved up and down by a bifurcated cam member 68 offset from the arm 66 to within the pulley 7, there engaging an eccentric 69 secured to the pulley. It will be understood that the bottom of the lug 65 moves in a path overlapping both bail-cranks 63' and 63" as to right-and-left dimension, displaced slightly rearwardly thereof (so that those cranks will not ordinarily be moved), and extending from slightly above the normal level of the tops of those cranks for a downward distance sufficient for the actuation of the punches.

The electromagnetic means for rendering the bail-cranks responsive to the lug 65 is illustrated in elevation for the crank 63" in Figure 10. It comprises an electromagnet 70" having a U-shaped frame 71" secured on one side (as through posts 72") to the top of the table 61a" with the open side of the U facing forwardly; an armature 73" resiliently hinged at the front of the top side of the frame 71" and biased away from contact with the central pole 74" of the electromagnet; a small L-shaped bracket 75" secured to the armature 73" and extending forwardly from the lower lefthand corner thereof; and a finger 76" pivoted to the bracket 75", extending rearwardly therefrom at the left of the electromagnet, rightwardly slightly offset behind the electromagnet—and ending in a vertical surface provided with a horizontal slot 76a" engaging a pin 77" secured in the side of the bail-crank 63", and in a folded-over horizontal surface resting on top of the extremity of that bail-crank. These means for both bail-cranks appear in plan in Figure 11, that for bail-crank 63' being entirely similar to that for bail-crank 63", excepting for a right-and-left reversal of arrangement and for a designation with numerals furnished with single-primes instead of double-primes.

It will be understood that upon actuation of either electromagnet 70' or 70", the associated armature 73' or 73" and the associated finger 76' or 76" will be moved rearwardly (which movement is permitted by the slot 76a' or 76a"). If the lug 65 be momentarily in a downward position, the completion of this movement may be delayed by impingement of the end of the finger against the front surface of the lug; this delay is momentary only, however, in view of the rapidity of oscillation of the lug. Accordingly with no more than negligible delay the rearward finger movement will be completed, and in its ensuing downward movement the lug 65 will engage the finger and therethrough press down on and move the associated bail-crank 63' or 63", actuating the associated bail and punch. The relative strengths of the resilient armature hinging and of the punch-arm springs 54' and 54" abovementioned may if desired be so chosen that the pressure of the lug 65 on the finger 76' or 76", once it has begun, will be sufficient through the resulting friction to hold the finger in rearward position until the completion of the punching operation and the upward return of the lug 65, in spite of an earlier cessation of the actuation of the electromagnet which caused the rearward finger movement. On the other hand, should the actuation of the electromagnet be needlessly long continued, there will occur simply a quickly repeated operation of the respective punch—which is of little consequence, even though the carriage be travelling, in view of the small distance of that travel per cycle of movement of the lug 65. An advantage of such intermittent operation of the punch in the event of continued electromagnet actuation, over a simple continued depression of the punch, is the elimination of any continuous engagement of the punch with the slip S—which might tend to tear the slip or at least to move it from its normal and proper position.

In its preferred form my invention contemplates the combining of the electrical circuits for the actuation of the electro magnets 70' and 70" (i. e., for the actuation of the annotating means) with the electrical circuits customarily employed for the control of the electromagnet assembly 24 (i. e., for the control of the operation of the phonograph) above described. This combination has been illustrated in Figure 12, in which figure the electromagnet assembly is represented, in simplified schematic form, by the showing of the single "stop" electromagnet 25 and single "start" electromagnet 26 with respective first terminals 25a and 26a and respective series contacts 33 and 34; and single armature Q carried by switch pole 32, which latter may be taken as pivoted at the point P. This figure also shows the entire electrical system as controlled by the conventional hook-switch H interposed in one line conductor 80; this switch is biased to closed position but is opened to place the entire apparatus out of operation by the resting of the speaking tube 21, or the mouthpiece thereto attached, on the hook portion H' (this hook-switch H, with its hook portion H', having been structurally shown in Figures 1, 2 and 3).

From the hook-switch H the line conductor 80 is connected by conductor 80a to a first side of the motor M which drives the pulley 7, and by the conductor 80b to the pole 32 of the electromagnet assembly 24. The other line conductor 81 is connected (as through the closed switch 82) to the second side of the motor M, and to the pole 84 of a switch assembly 87, through a spring 83 included in that assembly. By this spring the pole 84 is biased to touch a contact 85, which is connected by conductor 85a to "stop" electromagnet terminal 25a; the switch pole 84 may be thrown, however, to leave contact 85 and to touch contact 86, which is connected by conductor 86a to "start" electromagnet terminal 26a. It will be understood that so much of the circuit structure is conventional; that when the pole 84 is in its normal position touching the contact 85 the "stop" electromagnet 25 will have been last actuated and will have thrown pole 32 to the illustrated position to disengage the clutch, to open-circuit the "stop" electromagnet at 33, and to prepare the "start" electromagnet 26 for actuation by touching contact 34; that when the pole 84 is moved to touch contact 86 the "start" electromagnet will be energized and will throw pole 32 to the oppostie position to engage the clutch to open-circuit the "start" electromagnet at 34, and to prepare the "stop" electromagnet 25 for actuation by touching contact 33; and that when the pole 84 is thereafter released the first-mentioned conditions will again be restored. It will be understood that the switch assembly 87 is intended for location remote from the phonograph, a typical position therefor being on the mouthpiece as hereinafter more particularly described and illustrated, and that the three conductors 81, 85a and 86a (designated collectively in the drawings as C) are customarily the sole means of connection of the assembly 87 with the phonograph. Typically they may be led interiorly of the speaking tube 21 and neck 20 into a portion of the sound box 16, from which they may emerge to pass in convenient manner to the electromagnet assembly—which physical arrangement has been illustrated in Figure 3.

According to this embodiment of my invention I may employ, for actuating the annotating means, switching means located adjacent the switch assembly 87 or forming a part thereof, and thus remote from the phonograph; I may further utilize, for connecting such switching means with the phonograph, the same group C of three conductors as is used for connecting the control switch assembly 87; and in spite of these simplifications, and with only a single-pole single-throw switch for the annotating means, I may differentiate at will the actuation of the two distinct annotating means or punches 52' and 52". All this I do by employing, as a conductor for the actuating current for the annotating means, that one of the two conductors 85a and 86a which is then idle, and which is accordingly connected to that one of the "start" and "stop" electromagnets which is then prepared for actuation. The employment of the conductors 85a and 86a for this use may be prevented from actuating either of the latter electromagnets by limiting the current employed for the annotating means actuation to less than required to actuate the "start" or "stop" electromagnets; on the other hand, any actuation of the annotating means by the higher current employed for an intended actuation of either "start" or "stop" electromagnet is avoided as a result of the automatic limitation of current flow in the latter case to a momentary flow only (by virtue of the immediate open-circuiting at 33 or 34). I effect the selection between actuations of the two annotating means by causing the closure of the single annotating means switch to actuate one of those means (e. g., punch 52', for indication of length of dictation, for example) when the pole 84 is in its normal or "stop" position touching contact 85, and to actuate the other of those means (e. g., punch 52", for error or correction indications, for example) when the pole 84 is in its "run" position touching contact 86. In the latter case the mandrel of the machine will be running and the carriage executing its normal slow travel, but this has already been pointed out not to prevent a proper operation of the punch; it may further be pointed out that the operation of the machine during the making of error or correction annotations is frequently found positively beneficial, in that it permits the dictation of remarks regarding the significance of the annotations during the very act of making them—an obvious advantage in respect of efficiency and of certainty of correlation.

The switch means for actuating the annotating means has been shown as a pole 90 biased away from a contact 91 but closeable thereagainst by pressure on finger-piece 92. The means which makes available the idle one of the conductors 85a and 86a for purposes of annotating means actuation is a single-pole double-throw switch comprising pole 89 connected to pole 90 abovementioned, and contacts 85c and 86c respectively connected (as by conductors 85b and 86b) to the conductors 85a and 86a; the pole 89 is arranged to move in electrical opposition to the pole 84 abovementioned, being for example secured to an extension 88a formed from a pivoted insulating piece 88 which supports and forms a finger-piece for the pole 84. The means which limits the current flow employed for the annotating means actuation is a resistor 93 electrically connected between conductor 81 and contact 91. These components may be immediately associated with or comprised in the switch assembly 87.

As a means for electrically placing the annotation electromagnets 70' and 70" in condition to respond to the reduced current flow in either conductor 85a or 86a, while keeping available for their immediate actuation the full line voltage, I may insert in the conductor 80b (through which conductor any current in either conductor 85a or 86a must flow) the winding 96 of a low-voltage relay 95. (Preferably this relay will be of the so-called "slow-acting" type, which closes its armature-pole 97 against its contact 98 with a fraction of a second delay from the inception of actuation of its coil 96, thereby insuring a failure of complete response of the relay to the automatically limited actuation of either "start" or "stop" electromagnet 26 or 25.) The relay pole 97 may be connected to the line conductor 81, and the relay contact 98 to first terminals of the annotation electromagnets 70' and 70" through a selecting device 100, the other terminals of these electromagnets being of course effectively connected to the opposite side of the line by connection to conductor 80b.

The selecting device 100, which is positioned according to the position of finger-piece 88 and pole 84 and which in accordance with that position determines which one of the annotation electromagnets will be actuated upon depression of the finger-piece 92, may consist in a switch pole 101 carried by the electromagnet assembly pole 32 (but insulated therefrom as by insulation 101a) and connected through conductor 99 with relay contact 98 abovementioned; and two contacts 101' and 101", respectively touched by pole 101 when there has been last actuated the "stop" electromagnet 25 and when there has been last actuated the "start" electromagnet 26, and respectively connected with the first terminals of the annotation electromagnets 70' and 70" by the conductors 102' and 102". A typical embodiment of this arrangement of the selecting device 100, which has been schematically shown in Figure 12, is structurally shown in Figures 4 and 6; herein there has been added, to the electromagnet assembly 24 according to Langley as abovementioned, the upright insulating block 103 carrying the contacts 101' and 101", and to the arm or pole 32 there has been added the insulating block 101a to which in turn is secured the pole 101 for movement by the pole 32 to touch selectively the contacts 101' and 101".

The operation of this embodiment of my invention, having been disclosed in connection with the development of the structural and schematic description, need here be only broadly reviewed by pointing out that the switch pole 84 will be operated to start and stop mandrel rotation or phonograph operation in a conventional manner (e. g., through electromagnet assembly 24 and clutch 8) and without any incidental actuation of either annotating means; that to actuate one of the annotating means finger-piece 92 is depressed while pole 84 is released and the machine accordingly out of operation; and that to actuate the other of the annotating means finger-piece 92 is depressed while pole 84 is depressed against contact 86 and the machine accordingly in operation. In a broad aspect, therefore, I have disclosed the performance of two special functions in response to an identical operation of a single added switching device, selectively according to the position then obtaining of the conventional start-and-stop control, or according to whether the machine is then out of or in operation.

In Figures 13 through 17 I have continued the showing of this embodiment of my invention by a detailed illustration of a mouthpiece 110 secured on the end of the speaking tube 21, and carrying the switch assembly 87 and parts associated therewith in an arrangement according to the invention. In these figures the mouthpiece will be seen to consist generally of an essentially tubular portion 111 flaring gradually outwardly from the diameter of the speaking tube 21; a generally rectangularly cross-sectioned ridge portion 112 extending upwardly from the top of the portion 111, and extending longitudinally from the outer end of that portion toward the speaking tube 21 and finally tapering off in height; and a bell portion 113 internally communicating with but externally of larger diameter than the portion 111, extending forwardly and curving downwardly from the outer ends of the portions 111 and 112 for a short distance. These three portions may if desired be integrally molded of suitable plastic material. Into the open front of the bell portion 113 may be snapped, as by springs 116, the annular end member 114 carrying at its internal extremity the transverse plate 115 perforated for the passage of sound waves. In the top of the ridge portion 112 and of the bell portion 113 may be cut a continuous rectangularly cross-sectioned slot 117, of which the base portion 117a within the ridge portion 112 and the base portion 117b within the bell portion 113 may form with each other an angle greater than 180 degrees. The group of conductors C may be led from the interior of the speaking tube 21 partially through the interior of the tubular portion 111, and may then pass outwardly through a hole 118 in base portion 117a into the slot 117—there to be appropriately connected with the switch assembly 87 and parts associated therewith. These may be formed into a physical assembly—illustrated in plan in Figure 15, in vertical section in Figure 16, and in elevation in Figure 17—and this assembly inserted into the slot 117 and therein retained (subject to removal at will) by screws such as 149.

The switch assembly may be formed on a molded insert 120 generally of inverted U-shaped cross-section, having the side portions 120a and 120b and the base or top portion 120c; the latter may be cut away throughout most of the forward portion of the insert to form the aperture 121. Screwed upwardly into the base portion 120c near the rear of the insert 120 may be an insulating stack 122, into which are assembled the contacts 85 and 86 and (at the bottom) the forwardly extending and upwardly biased spring 83. Nearer the front of the insert 120 there may be secured between its side portions a cross-pin 123. Centrally of this cross-pin may be rockably mounted the insulating finger-piece 88, extending rearwardly from the cross-pin and upwardly through the aperture 121 for manipulability; on the bottom of this finger-piece 88 may be secured the spring pole 84, electrically contacted and upwardly biased by the spring 83 abovementioned. A little forward of the cross-pin 123 there may be secured in the insert side portion 120b, extending therefrom toward the other insert side portion, the pin contacts 85c and 86c. The finger piece 88 is extended forwardly of the cross-pin 123 by the extension 88a, and to the bottom of this extension is secured the spring pole 89 adapted to touch the contacts 86c and 85c when pole 84 touches contacts 85 and 86, respectively. Very near the front of the insert 120 there may be secured in its side portion 120a, extending therefrom toward the other side portion, the spring contact 91. On the cross-pin 123, between the centrally disposed finger-piece 88 and the insert side portions, may be rockably mounted the two bifurcations of a bifurcated insulating finger-piece 92, which extends forwardly from the cross-pin and upwardly through the aperture 121 for manipulability; a narrow upward extension 92a may be provided on the top of the finger-piece 92, if desired, for the immediate touch of the finger. The finger-piece 92 may be undercut at 92b, leaving the downwardly directed forward extremity 92c somewhat above the contact 91.

On the base portion 117b may be secured, as in an insulating block 124, a spring 125 extending both forwardly and backwardly from that block. The forward extremity of the spring 125 may be folded rearwardly to form the switch pole 90, disposed above and closeable against the contact 91 by means of finger-piece 92 (whose extremity 92c will be understood to be above the pole 90). The rearward extremity of the spring 125 may be folded over forwardly to press upwardly against, and to connect pole 90 electrically to, the pole 89 abovementioned, this upward pressure being of course made insufficient to overcome the upward bias of spring 83 against the pole 84 secured to the rear of the finger-piece 88.

The conductors 81, 85a and 86a (forming the group C) will of course after passing through the hole 118 be connected respectively to the spring 83 and the contacts 85 and 86. To these two last mentioned contacts may also be respectively connected the conductors 85b and 86b; these conductors may pass outwardly through a hole 119b in the insert side portion 120b, and may be forwardly conducted in an external slot 119b' in that portion to connect respectively with the outer ends of the pin contacts 85c and 86c. To the spring 83 may also be connected the conductor 93a; this conductor may pass outwardly through a hole 119a in the insert side portion 120a and into an enlarged external slot or recess 119a' formed in that portion, to connect to a first terminal of the resistor 93 which may be retained in that recess. From the other terminal of the resistor 93 a conductor 93b may pass forwardly within an external slot 119a'' to connect with the outer extremity of the spring contact 91 abovementioned.

The mouthpiece 110 as so described will be understood to have many advantages in respect of simplicity of assembly and compactness of the mentioned components, as well as in respect of appearance. There may additionally be noted the presence of a shoulder 110a formed between the tubular portion 111 and the bell portion 113, in view of the relatively larger diameter of the latter, and the utility of this shoulder in insuring retention of the mouthpiece on the hook H' of the hook switch H abovementioned when the mouthpiece is hung thereon during periods of disuse of the machine.

While in the preferred embodiment of my invention I have illustrated the annotating or punching means as operated by the power of the machine, I intend no unnecessary limitation of the broader aspects of my invention to that manner of operation, as any of a variety of other operating means may also be employed while retaining other advantages of my invention. To illustrate a particular such other means I have included the fractional Figure 18 illustrating the same in plan view, and Figure 19 illustrating the same in section. In the embodiment according to these figures the members 61' and 61'', connected to the bails 57' and 57'' in the above embodiment, are not used. Instead, to the top bail 57'' is secured the forwardly extending bail-crank 127''; and to the bottom bail 57' is secured the forwardly and leftwardly extending, horizontally disposed U-shaped member 127', of which the lefthand end arm 127a' is terminally pivoted to the rod 58 and acts (and is hereinafter referred to) as a bail-crank for the bail 57'. To the bail cranks 127a' and 127'' are pivotally secured, as through posts 126' and 126'', the lower extremities of the respective vertical rods or arms 128' and 128'', respectively carrying plungers, one of which appears in Figure 19 as 129'', of magnetic material at their top extremities. Encircling these plungers and normally disposed principally thereabove are the respective solenoids 130' and 130''; these may be secured with respect to the base 1 by any convenient means, such as by one or more brackets 131 (see Figure 19). It will be understood that upon actuation of either solenoid 130' or 130'' its respective plunger 129' or 129'' will be attracted upwardly to a vertically centralized position within the solenoid, rocking its respective bail 57' or 57'' rearwardly to actuate a respective one of the annotating or punching means 52' and 52''. The solenoids 130' and 130'', when employed, may be electrically connected in circuit just as would be the respective electromagnets 70' and 70'', which (together with other associated mechanism above described) they obviously replace.

Since an actuation of either annotating or punching means by the respective solenoid is not intermittent, but rather continuous so long as the solenoid remains actuated, it may be desirable in this case that the operation of the machine be suspended during that actuation, which may be done without sacrificing any of the other desirable features above described. This suspension may be effected by breaking the direct connection of one motor terminal to the line conductor 81 (as by leaving open the switch 82) and connecting this terminal as through a conductor 82a to a contact 82b against which the pole 97 of relay 95 rests excepting when that relay is actuated. Since that pole is connected to the line conductor 81, the operating circuit of the motor is normally unimpaired. When the relay 95 is actuated as an incident to the actuation of either annotating means, however, the motor circuit is automatically broken by pole 97 being out of contact with 82b so long as that actuation continues—so that the machine is placed out of operation for that period, independently of whether or not the clutch 8 is disengaged. (The operations of the two annotating means may of course be selected between as before—by the position of the conventional start-and-stop control.) The frequent objection to motor-circuit control of operation and non-operation of the machine—that there is a momentary delay in coming up to speed, during which for example dictation may be distortedly recorded—hardly obtains in this special case, in view of an instinctive tendency of the dictator to pause momentarily before resuming dictation after an actuation of either annotating means.

In Figures 2 and 3 I have shown a removable drawer 152 disposed beneath the path of travel of the punching means—more specifically, beneath the path of travel of the die-block 53—for the collection of punchings from index slips S. This drawer 152 may rest on a shelf 151 secured between the upright ends 42 and 43 of the supporting member 44, the shelf being provided for example with the rear upturned flange 152a to limit rearward movement of the drawer.

While I have particularly illustrated my invention in connection with a phonograph having a mouthpiece for the collection or dispersal of sound, a speaking tube for the conveyance of sound, and a sound box for the translation of sound into mechanical oscillations or vice versa, it will be understood that my invention—by virtue of its controllability remotely from the phonograph—is uniquely adapted for use with an electrically operated phonograph (i. e., wherein there are created electric oscillations corresponding to the sound recorded or to be recorded). Accordingly in Figure 20 I have schematically illustrated an embodiment wherein the mouthpiece is replaced by a hand-piece J equipped with microphone K, wherein the speaking tube is replaced by a pair of wires K' connected to the microphone (shielded as by shielding L) and leading to the input of an amplifier A, and wherein the sound box is replaced by an electro-mechanical translating device Z connected as by conductors A' to the output of the amplifier A (the translating device Z being for example of the so-called "bi-morph" piezo-electric type). The conductors 81, 85a and 86a may be connected between the phonograph and the hand-piece J, being in the hand-piece terminally connected to spring 83 and contacts 85 and 86 as in earlier figures, and the spring 83 contacting the pole 84 which may be controlled by any suitable finger-piece such as schematically shown as X. It will be understood that otherwise the circuit may be similar to that of Figure 18, the various additional switching means formerly provided in the mouthpiece 110 being in this instance provided in the hand-piece J.

It is to be understood, however, that in any case the broader aspects of my invention are not necessarily limited to the use of the conductors 85a and 86a, forming start-and-stop control conductors, for the actuation of the annotating means, or to the selection between actuations of those two means according to the position of the start-and-stop control, and the like. Accordingly in Figure 20, by way of example, I have shown in the hand-piece J separate switch poles L' and C', respectively closeable against the contacts L" and C", and those contacts respectively connected by conductors 145 and 146 directly to the annotation electromagnets 70' and 70"—the poles L' and C' being both connected (as through conductor 81a and spring 83) to the line conductor 81, so that upon depression of either finger-piece L or C a respective one of the annotating means will be actuated. In this instance of course the relay 95 and the selecting device 100 may be omitted.

While I have shown and described my invention in terms of particular embodiments thereof, with particular groupings of features in those several embodiments, it will be understood that I intend no unnecessary limitations by virtue of the details of those embodiments or of those groupings. Rather in many of the appended claims I undertake to express the scope of my invention broadly, subject however to such proper limitations as the state of the art may impose. No claims however are made herein specifically to the disclosed combination of two electrical work circuits (e. g., 24 and 95—70'—70") respectively actuated by currents of different strengths; or specifically to the disclosed combination of two conductors (e. g., 85a and 86a) and their switch (e.g., 84—85—86) for one function with means for rendering the idle one of the conductors effective for another function; or specifically to other allied electrical features not peculiarly related to phonographs. This subject matter has been disclosed and claimed in my co-pending application Serial No. 356,881, filed September 14, 1940.

I claim:

1. In a phonograph including a translating device and motive means for effecting relative movement of the translating device and a record: the combination of annotating means arranged for movement with the translating device; an actuating member moved by said motive means; and means operable at will to subject said annotating means to operative movement by said actuating member.

2. In a phonograph including a translating device and motive means for effecting relative movement of the translating device and a record: the combination of annotating means arranged for movement with the translating device; an actuating member recurrently moved by said motive means; and means operable at will to subject said annotating means to intermittent operative movement by said actuating member.

3. In a phonograph including a translating device and motive means for effecting relative movement of the translating device and a record: the combination of a rockable bail; an actuating member moved by said motive means; means operable at will to subject said bail to rocking by said actuating member; and annotating means responsive to the rocking of said bail.

4. In a phonograph including a translating device and motive means for effecting relative movement of the translating device and a record: the combination of a rockable bail; a bail-crank therefor; an actuating member moved by said motive means; a finger associated with said bail-crank; and means operable at will to move said finger into the path of said actuating member for rocking of said bail by said member.

5. In a phonograph including a translating device and motive means for effecting relative movement of the translating device and a record: the combination of annotating means arranged for movement with the translating device; means operable at will to actuate said annotating means; and means, connected with and responsive to said actuating means, for suspending the operation of said motive means during the operation of said annotating means.

6. In a phonograph including a translating device, continuously operable motive means for effecting relative movement of the translating device and a record, and a clutch engageable and disengageable to the control said movement: the combination of annotating means arranged for movement with the translating device; means operable while said clutch is engaged to actuate said annotating means; and means, connected with and responsive to said actuating means, for suspending the operation of said motive means during the operation of said annotating means.

7. In a phonograph including a translating device and means for effecting relative movement of the translating device and a record: the combination of a start-and-stop control for said movement; a pair of annotating means for making annotations positionally corresponding to the position of the translating device relative to the record; a single annotation-control; means, responsive to said device when said start-and-stop control is in stop position, for actuating one of said annotating means; and means, responsive to said device when said start-and-stop control is in its other position, for actuating the other of said annotating means.

8. In a phonograph including a translating device and means for effecting relative movement of said device and a record as a main operation of the phonograph: the combination of a start-and-stop control for said main operation; a pair of means each actuable to perform a respective auxiliary operation; a single auxiliary control device; means, responsive to said auxiliary control device when said start-and-stop control is in stop position, for actuating one of said pair of means; and means, responsive to said auxiliary control device when said start-and-stop control is in its other position, for actuating the other of said pair of means.

9. In a phonograph including a translating device and means for effecting relative movement of the translating device and a record: the combination of a start-and-stop control for said movement; a pair of annotating means for making annotations positionally corresponding to the position of the translating device relative to the record; a single device operable at will to actuate said annotating means; and means for selecting the annotating means to be actuated upon operation of said single device, said selecting means being operatively connected with and controlled by said start-and-stop control.

10. In a phonograph including a translating device and means for effecting relative movement of said device and a record as a main-operation of the phonograph; the combination of a start-and-stop control for said main operation; a pair of means each actuable to perform a respective auxiliary operation; a single device operable at will to actuate said last-mentioned means; and means for selecting the one of said pair of means to be actuated upon operation of said single device, said selecting means being operatively connected with and controlled by said start-and-stop control.

11. In a phonograph including a translating device and means for effecting relative movement of the translating device and a record: the combination of a movable start-and-stop control for said movement; annotating means for making annotations positionally corresponding to the position of the translating device relative to the record, said annotating means being variously actuable to make selectively a plurality of different annotations; and means, operatively connected with and controlled in accordance with the position of said start-and-stop control, for variously actuating said annotating means selectively in accordance with said control position.

LOUIS Z. LA FOREST.

CERTIFICATE OF CORRECTION.

Patent No. 2,218,542.　　　　　　　　　　　　　　October 22, 1940.

LOUIS Z. LA FOREST.

It is hereby certified that error appears in the printed specification of the above numbered patent requiring correction as follows: Page 4, first column, line 18, for "62''" read --61''--; page 8, second column, line 35, claim 6, strike out the article "the" before "control"; line 50, claim 7, after "annotation-control" and before the semicolon, insert --device--; and that the said Letters Patent should be read with this correction therein that the same may conform to the record of the case in the Patent Office.

Signed and sealed this 31st day of December, A. D. 1940.

(Seal)　　　　　　　　　　　　　　　　　　　　　　Henry Van Arsdale,
　　　　　　　　　　　　　　　　　　　　　Acting Commissioner of Patents.